Figure 1:
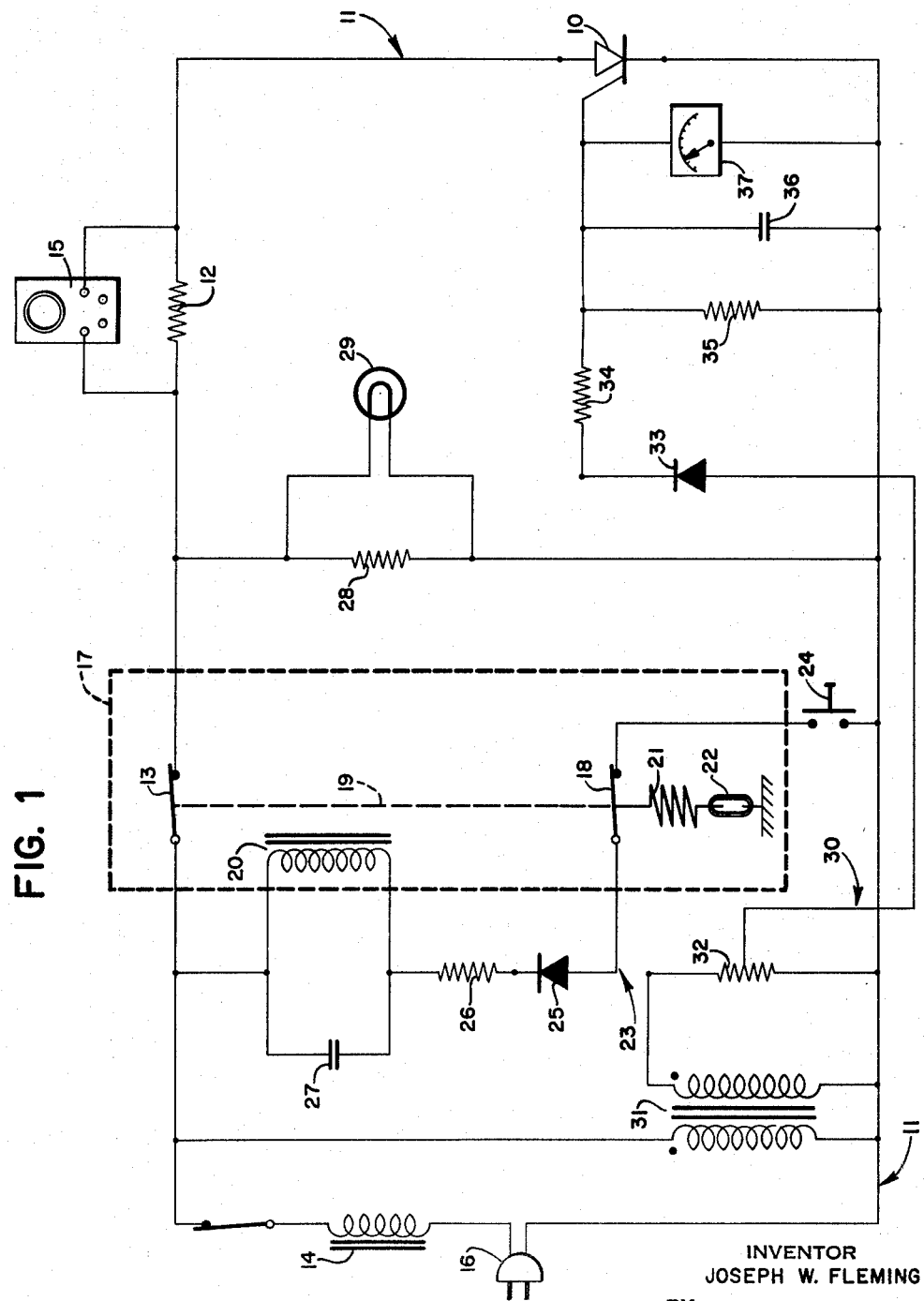

INVENTOR
JOSEPH W. FLEMING
BY
ATTORNEYS

United States Patent Office 3,193,766
Patented July 6, 1965

3,193,766
CONTROLLED SILICON RECTIFIER TEST APPARATUS FOR DETERMINING DEFECTS AND OPERATING CHARACTERISTICS
Joseph W. Fleming, Allendale, N.J., assignor to Electronic Dimmer Corporation, New York, N.Y., a corporation of New York
Filed Feb. 17, 1961, Ser. No. 90,022
7 Claims. (Cl. 324—158)

This invention relates to test apparatus for solid state devices known as controlled silicon rectifiers.

Controlled silicon rectifiers available at the present time are frequently defective in that they may have a characteristic which permits uncontrollable self-firing or "flashover" completely independently of the gate signal. In many applications this fault does not manifest itself because the operating conditions do not bring it out. There are, however, applications where voltage with a very fast rise time may be applied to the rectifier anode and it is this condition which brings out the flashover defect. It will appear even though the rectifier gate may be floating or at cathode potential and even though the applied voltage may be less than that for which the controlled silicon rectifier is rated.

My experience has shown that as many as 50% of commercial controlled silicon rectifiers may have this defective characteristic. It is related to the internal structure of the rectifiers and practical correction with circuit design has not proven feasible. Moreover, it has not been possible to determine, in advance of actual use in particular applications and under the specific conditions which make the defect manifest, that a particular rectifier is faulty. But operation of many kinds of apparatus with rectifiers which are defective can be very costly and inconvenient because flashover usually results in damage to the rectifier units and to associated electrical apparatus.

Difficulties produced by flashover can be illustrated by considering theater dimmer operations. Dimmers may be turned on or plugged into a circuit during the peak of a positive or normally conductive voltage half-cycle. Under these conditions a defective rectifier becomes fully conductive immediately and current surges during the one-half cycle may be sufficient to damage the rectifier and associated apparatus or to destroy a fuse. Moreover, the resistance of incandescent lamps is quite low when the lamps are cold. An overload of several hundred percent is to be expected if full voltage is applied, which occurs upon flashover, and the resulting damage to the dimmer and the lights can be quite severe. Aside from the fact that the necessary repairs are expensive and inconvenient, a dimmer may frequently be ruined the first time it is used and this has an adverse effect upon the reputation of the dimmer manufacturer.

Until very recently the only diagnosis of the trouble, when a failure was observed, was a general one of "bad rectifier." How or in what degree it was "bad" was unknown. The only correction offered was replacement and no one could be sure that a new rectifier would give better service.

The nature of the defect is still to my knowledge, unknown. In fact until recently, the precise operating conditions under which flashover would appear were not known either. It is as a result of extensive experimentation that I have been able to define these conditions, which are as I have described them above. Knowing that a great many controlled silicon rectifiers fail under these conditions, it is quite apparent that a means for determining in advance whether a particular controlled silicon rectifier is sound in all respects is very desirable.

I have invented test apparatus with which one may easily and quickly determine whether a controlled silicon rectifier does or does not have the flashover characteristic. In addition to this principal feature of the invention, the nature of the apparatus is such that it may readily cooperate with means for determining other significant operating characteristics of controlled silicon rectifiers.

My invention comprises means for applying a rapidly rising voltage to the anode of a controlled silicon rectifier and means responsive to current to indicate that a rectifier is conducting. I also provide means for adjusting the potential applied to the gate of a controlled silicon rectifier so that the operating conditions mentioned which bring out the flashover defect may be simulated and also to permit additional useful testing of those rectifiers which do not exhibit flashover.

One form of my invention is adapted for operation on alternating voltage. In this embodiment, a loaded first circuit in which the anode and cathode of the controlled silicon rectifier to be tested are connected, is provided with automatic switching means. The switching means are adapted to be synchronized with the alternating source voltage so that the first circuit may be closed at a predetermined electrical angle in the cycle of the alternating voltage. The predetermined angle is that angle when supply voltage is a maximum in the positive voltage half-cycle, the positive half-cycle being defined as the half-cycle during which current may flow through the rectifier. That angle is, of course, 90° for ordinary sinusoidal line voltage. By closing the first circuit at this angle, the anode potential of the rectifier rises substantially instantaneously to a maximum value, the condition indicated for observing flashover if the rectifier is defective. Means indicative of rectifier current are connected to the first circuit so that the time required for test operations is minimal.

For flashover testing only, the controlled silicon rectifier gate may be simply connected to the cathode in the first circuit. In order to conduct other tests, I also provide an adjustable source of direct current potential in my invention for controllably biasing the gate of a rectifier under test. By using such a source in a third or firing circuit, useful rectifier operating data can be obtained with my invention. Thus, when a rectifier does not exhibit the flashover characteristic, it may be further tested to determine gate potential at which normal firing occurs and to determine normal gate current when the rectifier is conducting.

A modification of my invention is adapted for use where direct current voltage is available. In this form, one side of the first circuit is connected to the movable contact of a potentiometer so that the first circuit voltage may be changed and controlled silicon rectifiers of many different ratings can be tested. A similar contact may be connected to the gate to provide variable gate potential also. Synchronized switching means are, of course, not required for the D.C. embodiment but automatic switching means may be used, nevertheless, to provide automatically the conditions which produce flashover. Means responsive to rectifier current are also incorporated for expediting test operations.

All of the tests can be completed with my invention in a very short time. The apparatus is easy to operate and the procedure readily made routine. Defective controlled silicon rectifiers can be promptly discovered. By incorporporation of a protective device, such as an overcurrent relay, to insure against damage from flashover or from operator error, even a defective rectifier will not be injured in testing. Normal operating data for non-defective rectifiers may be obtained and the user is assured of their reliability before they are installed and used.

These and other features of my invention are set forth in detail in the following portion of the specification.

Figure 2:
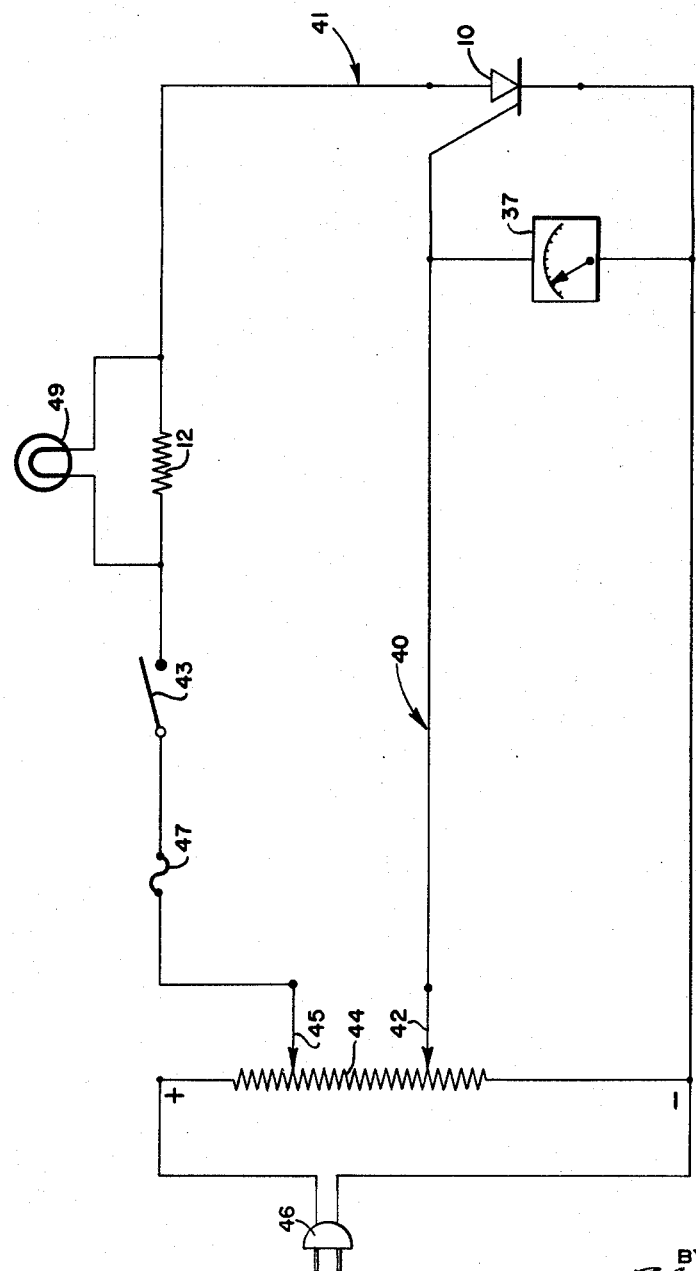

In the accompanying drawings:

FIG. 1 is a schematic representation of a preferred embodiment of my invention; and FIG. 2 is a schematic representation of a second embodiment of my invention.

In FIG. 1, a controlled silicon rectifier is shown at 10. The rectifier is connected in an outer loop 11 which will be referred to as a first circuit. As indicated, a load 12, a first switch 13 and a circuit breaker 14 are connected in series with the controlled rectifier 10 in the first circuit.

The circuit breaker 14 shown is a solenoid-operated relay which is adjusted to open the first circuit when current exceeds a predetermined value. Its purpose is to provide over-current protection so that apparatus will not be damaged in testing. Over-current relays are common in the art and are convenient for use in this invention because if they operate, it is only necessary to reset them for succeeding tests. However, other means such as a fuse may be used for this purpose.

A load such as a resistor 12 is connected in the first circuit, adjacent the controlled silicon rectifier so that the circuit will not be shorted when the rectifier conducts. In the embodiment shown, load resistor 12 is connected to the anode of the silicon control rectifier.

Load resistor 12 also provides a convenient location for connecting an oscilloscope so that the wave form of current through the controlled silicon rectifier may be observed. For this purpose, a cathode ray oscilloscope is indicated at 15, connected in shunt across the load.

Means such as a plug 16 are provided so that the circuit may be connected to an ordinary source of alternating voltage such as one providing 60-cycle 115-volt power. The cathode of the rectifier is of course connected to the side of the first circuit opposite to that in which the anode is connected.

First switch 13 is part of a two-switch, solenoid-operated relay indicated at 17 by the dotted enclosure. As indicated, the first switch is normally closed. The second switch 18 of relay 17 is mechanically connected, as indicated by the dotted line at 19, to first switch 13, so that the two switches are operated simultaneously when coil 20 of the relay is energized. Second switch 18 is also normally closed.

A variable tension device is also connected to the switches 13 and 18 so that the force required to open them, and hence the current required in coil 20 to operate them, can be adjusted. For this purpose, means such as a coil spring and turnbuckle, indicated at 21 and 22, may be used.

Second switch 18 and coil 20 of relay 17 are part of a second or timing circuit 23 which is connected in shunt across the load 12 and rectifier 10. A manually operable switch 24, normally open, is connected in series with second switch 18 in this second circuit for pulsing relay 17 and initiating the flashover test. A half-wave rectifier 25 and timing resistor 26 are also connected in series with second switch 18 in the second circuit and a capacitor 27 is connected in shunt across solenoid 20.

A load lamp is also provided as a convenient indicator for the flashover test. For this purpose a high resistance 28 is connected across the load resistance 12 and rectifier 10 and a lamp 29 is provided in parallel with resistance 28.

A third or firing circuit 30 is arranged for supplying an adjustable gate voltage to the controlled silicon rectifier to test the normal operation of the unit. In the embodiment of FIG. 1, the firing circuit comprises a stepdown transformer 31, the primary of which is connected across the 115 volt lines. The secondary winding of the transformer provides a low voltage such as 6 volts A.C. and is connected to a potentiometer 32. The variable tap on the potentiometer is connected to a half-wave rectifier 33 which is in turn, connected through resistor 34 to the rectifier gate. For accuracy, a noise suppression circuit may also be inserted. This is shown in the drawing by resistor 35 and capacitor 36 in parallel across the gate and cathode of rectifier 10. A peak calibrated direct current voltmeter 37 is also connected across the gate and cathode of the rectifier 10 so that gate firing voltage may be observed.

Functions of components not yet fully explained will be apparent from the following description of test procedure.

Potentiometer 32 is first set to zero and plug 16 is connected to the source of alternating voltage. Circuit breaker 14 and switches 13 and 18 are closed (their normal positions) and manual switch 24 is left open.

To test for normal firing of the silicon control rectifier, the potentiometer 32, which controls the signal voltage from the secondary of transformer 31, is turned up gradually until the rectifier fires. As is apparent from the drawing, the gate signal voltage is in phase with the supply voltage and is half wave D.C. Thus the peak signal occurs at 90° during the conduction half-cycle and the controlled silicon rectifier fires first with a conduction angle of 90°. By observing the oscilloscope 15 and voltmeter 37 as the potentiometer is moved up, the signal voltage at which the controlled silicon rectifier fires may be read on the voltmeter when a voltage appears across load resistor 12 (i.e., when a waveform appears on the oscilloscope).

The amount of current required to fire the gate of the rectifier 10 may also be determined from this same test. A particularly simple and convenient means for obtaining this information is a current calibrated scale on the potentiometer and a pointer on the adjustment knob. After the controlled silicon rectifier fires in the fashion described above, firing current is determined merely by reading the position of the pointer on the scale. Other devices such as, for example, an ammeter connected in the gate circuit may be used but where many rectifiers of the same type are to be tested, the potentiometer calibration arrangement is very efficient.

For flashover testing, tension on the two switches 13 and 18 of relay 17 is first adjusted to provide for reclosure of these switches at a desired angle in the supply voltage cycle.

As has been described, defective controlled silicon rectifiers fire, regardless of gate voltage, when their circuits are closed so that maximum line voltage is initially applied to the rectifier anode. This maximum voltage is of course at the 90° point in the supply voltage positive half cycle (where positive half cycle is defined as that which normally sustains current flow through the rectifier). It is at or nearly at this angle of supply voltage that voltage is applied to the controlled silicon rectifier anode in this embodiment for flashover testing.

Now, by referring to the drawing, it may be seen that by closing switch 24 and applying direct current voltage to capacitor 27, the capacitor is charged at a rate governed by the size of timing resistor 26 in the second circuit 23. This rate is not critical but it is desirable that the capacitor becomes sufficiently charged after only a few cycles of applied voltage so that tests may be completed in a short time.

It is seen, of course, that when switch 24 is closed current in coil 20 is initially zero and capacitor current is maximum. Capacitor current decays rapidly as the capacitor charges, and the current in coil 20 increases until it is sufficient to open switches 13 and 18 against the force of spring 21. After switches 13 and 18 open, the capacitor discharges through coil 20. As the capacitor discharges, coil current decays until there is no longer sufficient power to hold switches 13 and 18 open, whereupon they reclose and the cycle is repeated. This cycle may be made as rapid or as slow as desired, depending on the size of the resistance and capacitor elements used in the second circuit and on the amount of spring tension.

Thus, with a controlled silicon rectifier made to fire in the normal fashion, as after completion of a normal firing test described above, for example, proper tension is readily obtained by pulsing relay 17 (i.e., by closing manual switch 24), observing the waveform of the voltage across load resistor 12, and adjusting spring tension (i.e., by tightening or loosening turnbuckle 22) until the waveform on the oscilloscope 15 corresponds to the shape of the 90° to 180° portion of the applied voltage cycle. When such a waveform is observed, switches 13 and 18 are synchronized to reclose at peak voltage in the conducting or positive half cycles of the applied voltage.

With this condition obtained, the apparatus of the invention is ready for flashover testing. The potentiometer 32 is then adjusted so that controlled silicon rectifier gate voltage and cathode voltage are equal. In the embodiment shown, the potentiometer is thus set to zero. Relay 17 is then pulsed by closing switch 24. Thereafter, switches 13 and 18 cycle as above described, reclosing at times of maximum positive line voltage. If the rectifier fires, lamp 29 will flash and a waveform will be observed on the oscilloscope to tell the operator that the rectifier being tested is defective.

Other synchronized switching means such as a synchronous motor driven commutator switch may be employed for opening and closing the first circuit. But I have found the timing means described to be extremely reliable. It is an inexpensive, compact arrangement in which the relay has the only moving parts. It is also easily adjusted and the closing angle for the first circuit may be changed, if desired, by adjusting the tension means.

In the embodiment of FIG. 2, the anode and cathode of controlled silicon rectifier 10 are connected in a first circuit 41 which is adapted for operation on direct current. Means such as a plug 46 are provided for connecting to the D.C. voltage source. A potentiometer 44 is connected in the first circuit so that anode voltage may be changed for testing rectifiers of various ratings.

The potentiometer shown has two sliding contacts 42 and 45. One terminal of the potentiometer, labeled (−) is connected to the cathode side of first circuit 41 and the opposite or upper sliding contact 45 is connected to the anode side of the first circuit. The lower sliding contact 42 is connected to a firing circuit 40 which controls rectifier gate potential.

Two potentiometers may be used, of course, but the arrangement shown is advantageously simple. It is also quite satisfactory because the range of desired gate potential is relatively lower than the range of desired anode voltages for testing.

Means responsive to rectifier current are also provided. For this purpose a lamp 49 is shown connected across load 12. A first circuit load 12 and a voltmeter 37 are provided as before. Means such as fuse 47 are included for over-current protection.

A manually operated switch 43 completes the first circuit in this embodiment.

Operation of this embodiment is analogous to that previously described for the A.C. embodiment. Slider 42 is moved to zero and slider 45 is moved to the desired voltage setting for the rectifier being tested. Closing switch 43 applies maximum positive voltage to the controlled silicon rectifier. If the rectifier is defective, current flows in the first circuit, producing a voltage drop across load 12. This voltage drop causes lamp 49 to light indicating flashover.

Then for a non-defective rectifier slider 42 may be raised until the rectifier conducts permitting normal gate voltage and current data to be collected.

If desired, a second circuit for automatic, timed cycling of the first circuit switch may be used in this embodiment. Such a second circuit may be connected in the same way as circuit 23 in FIG. 1 except that rectifier 25 is not used. The first circuit switch then comprises part of a two-switch relay (such as 17 in FIG. 1) and a pulsating D.C. voltage is applied to the controlled silicon rectifier anode after the relay circuit is energized. This arrangement permits automatic operation of the flashover test.

In practice, the procedure for the tests which have been described is quickly reduced to routine and a great many controlled silicon rectifiers can be tested in a short amount of time. Providing over-current protection means assures that no damage will be done and the tests are non-destructive and very positive. Each controlled silicon rectifier can be tested for flashover and normal gate voltage and gate current data can be obtained. Most importantly, those passing the flashover test may then be relied on to give the service which is expected of them.

My invention has been described with detailed reference to operative embodiments thereof. It is to be understood that changes in these embodiments may be made without departing from the invention. The scope of my invention is set forth in the following claims.

I claim:

1. Apparatus for testing a controlled silicon rectifier having anode, cathode, and gate terminals, which apparatus comprises: a relay having two normally closed switches which are mechanically connected together for simultaneous operation between opened and closed positions, a coil for magnetically operating said switches and adjustable tension means connected to said switches biasing the same to said normally closed positions; a first circuit adapted to be connected to a source of alternating voltage and having in series one of said relay switches, load means and the anode-cathode terminals for said controlled silicon rectifier; means connected in shunt across said load means for providing a visible representation of the waveform of the voltage appearing thereacross; a lamp connected in shunt across said load means and the anode-cathode terminals for said controlled silicon rectifier; a second circuit adapted to be connected to said source of alternating voltage and having in series, said coil, the other of said relay switches, a manually operable switch, rectifier means and timing resistance means and having a capacitor connected in shunt across said relay coil; an adjustable source of direct current bias voltage connected between the gate and cathode terminals of said controlled silicon rectifier; and, voltmeter means connected across the gate and the cathode of said controlled silicon rectifier.

2. Apparatus for testing a controlled silicon rectifier having anode, cathode, and gate terminals, which apparatus comprises: a relay having two normally closed switches which are mechanically connected together for simultaneous operation between opened and closed positions, a coil for magnetically operating said switches and adjustable tension means connected to said switches biasing the same to said normally closed positions; a first circuit adapted to be connected to a source of alternating voltage and having in series one of said relay switches, load resistance means, the anode-cathode terminals for said controlled silicon rectifier, and overcurrent protection means, said load resistance means being connected to the anode terminal of said controlled silicon rectifier; oscilloscope means connected in shunt across said load resistance means; a lamp connected in shunt across said load resistance means and the anode-cathode terminals for said controlled silicon rectifier; a second circuit adapted to be connected to said source of alternating voltage and having in series, said coil, the other of said relay switches, a manually operable switch, rectifier means and timing resistance means and having a capacitor connected in shunt across said relay coil; a firing circuit connected to the gate terminal of said controlled silicon rectifier and including a step-down transformer the primary of which is adapted to be connected to said source of alternating voltage, a potentiometer having a resistance element and a movable tap thereon, said resistance element being connected to at least a portion of the secondary of the transformer, and rectifier means connected between the movable tap of the potentiometer and the gate terminal of said controlled silicon rectifier; and voltmeter means connected across the gate and the cathode of said controlled silicon rectifier.

3. The apparatus of claim 2 in which: said second circuit rectifier means comprises a half-wave rectifier disposed so that its conducting half cycle is opposite in phase to that of said first circuit.

4. The apparatus of claim 2 in which: said firing circuit rectifier means comprises a half-wave rectifier disposed so that its conducting half cycle is in phase with that of said first circuit.

5. The apparatus of claim 2 in which: said voltmeter means comprises a peak-calibrated direct current voltmeter.

6. The apparatus of claim 2 in which said oscilloscope means comprises a cathode ray oscilloscope.

7. The apparatus of claim 2 in which said overcurrent protection means comprises an overcurrent relay.

References Cited by the Examiner
UNITED STATES PATENTS

| | | | |
|---|---|---|---|
| 2,988,672 | 6/61 | Kiltz | 307—133 X |
| 3,054,954 | 9/62 | Boscia et al. | 324—158 |

OTHER REFERENCES

"Controlled Rectifier Manual," copyright 1960 by the General Electric Company, 1st Edition, pages 198–203 relied on.

WALTER L. CARLSON, *Primary Examiner*.

LLOYD McCOLLUM, *Examiner*.